Nov. 5, 1968　　　M. B. WIDESS ET AL　　　3,409,355
TRACE SLITTED RECORD SECTION

Filed Sept. 17, 1965　　　　　　　　　　3 Sheets-Sheet 1

MOSES B. WIDESS
THOMAS J. WILLIAMS
INVENTOR

BY Paul Hawley

ATTORNEY

Nov. 5, 1968  M. B. WIDESS ETAL  3,409,355
TRACE SLITTED RECORD SECTION
Filed Sept. 17, 1965  3 Sheets-Sheet 2

MOSES B. WIDESS
THOMAS J. WILLIAMS
INVENTORS.

BY Paul F. Hawley

ATTORNEY.

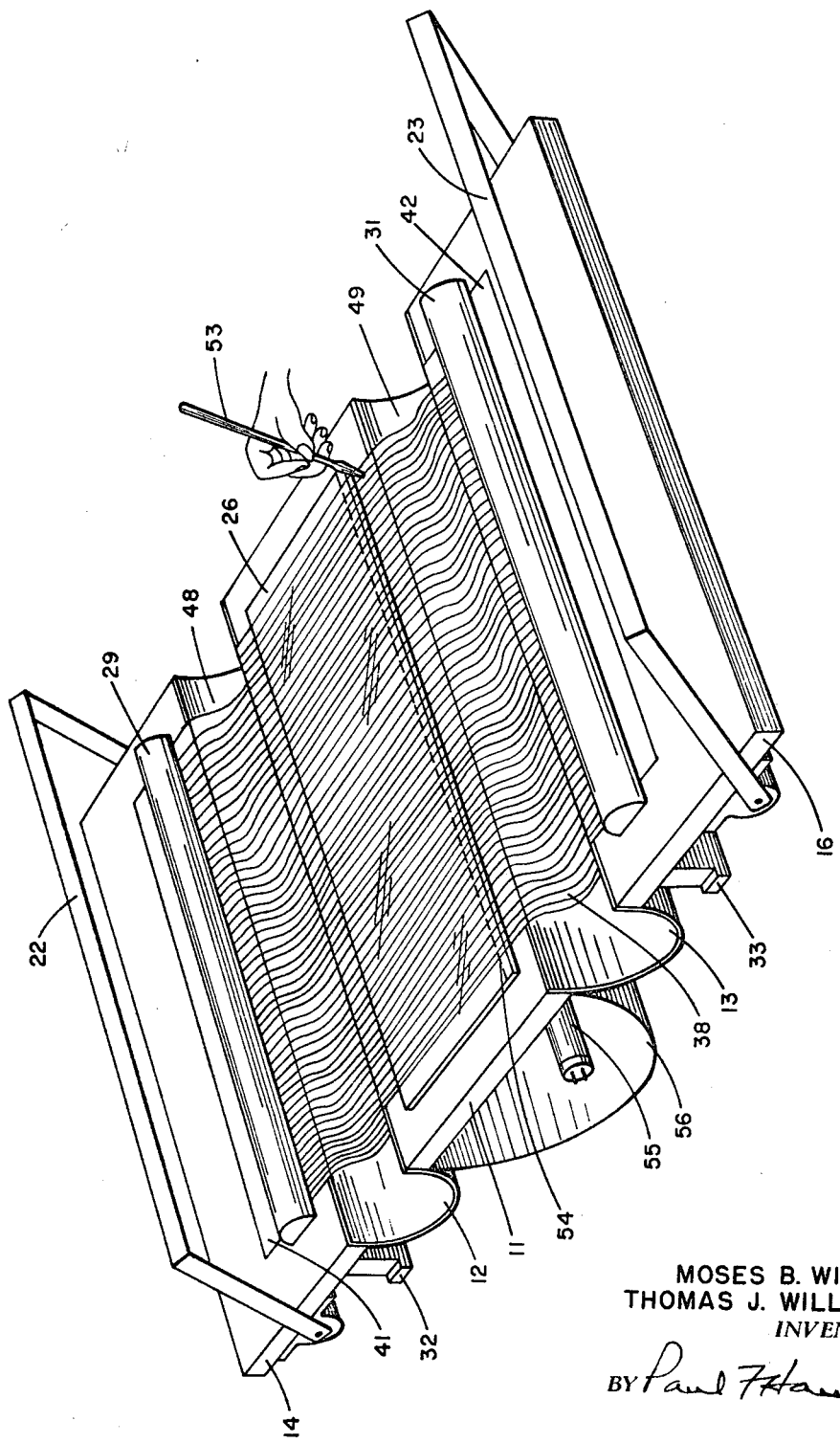

3,409,355
TRACE SLITTED RECORD SECTION
Moses B. Widess, Fort Worth, Tex., and Thomas J. Williams, Gretna, La., assignors to Pan American Petroleum Corporation, Tulsa, Okla., a corporation of Delaware
Filed Sept. 17, 1965, Ser. No. 488,140
5 Claims. (Cl. 355—2)

ABSTRACT OF THE DISCLOSURE

This apparatus consists of a mechanism used to adjust seismic data or similar time-varying information recorded so that it is displayed in cross-section form, such data include records made in side-by-side relation. It is frequently desirable to be able to shift a part of the information along the time axis compared to other information. The apparatus provides for illumination of a slitted record by means of a transparent tabletop or equivalent, the record being positioned and in contact with the table by at least one friction plate and secured by weights in such fashion that the individual traces may be moved in a direction parallel to the slits.

---

In surveying and mapping of subsurface geological strata by the seismic method, several techniques are available. By the traditional and still the most widely used system, the survey procedure consists essentially of generating a seismic wave by exploding a charge of dynamite buried in a borehole. Seismic waves, principally compressional, emanate in all directions from this source; those which travel downward into the earth to pass through the successive strata of rock, shale and sand are of prime usefulness in conducting a search for petroleum deposits. In travelling through the beds of varied character, the downward moving wave encounters contrasts in the seismic transmission properties of dissimilar geological elements. At these acoustic interfaces, a portion of the wave is reflected back to the surface where its arrival is detected by one or more geophones.

The geophones move with the earth's surface on which they stand and by so doing generates an electric current; the magnitude and instantaneous direction of flow of this current is related in a known manner to the motion of the earth where the geophones are placed. Signals thus generated are conducted by electrical cables to amplifying, filtering and recording means usually located nearby. Typically, the signal generated by a geophone is a train of waves which may overlap and vary in frequency, amplitude and phase to produce a complex, time varying, electrical function. A wave reflected from shallow beds arrives at the surface of the ground only hundredths of a second after the instant of the dynamite shot. Waves reflected from successively deeper geologic features arrive progressively later. Thus, the signal which is recorded represents the two-way travel time, that is, downward from the shot to a reflecting interface and back to the surface. A train of such events may persist for several seconds, representing data from increasingly deeper beds.

What we have referred to as a geophone is in practice usually a group of geophones electrically connected to provide a single signal to a recording channel. In routine seismic surveying many such geophone groups are commonly used to receive the signals reflected from subsurface features and to produce a corresponding electrical signal. The signals from each such group are usually amplified, filtered, and recorded separately by one of several techniques. The more common recording method at present is one which places the signals on magnetic tape. A large number of such information channels (twenty-four customarily) are recorded simultaneously on adjacent tracks of the tape. These signals can be reproduced and displayed in any of several forms. Our invention relates to seismic signals which have been reproduced as variable density or variable area tracks positioned adjacent each other to form what is commonly called a cross section. Such a cross section consists of data from a number of successive field survey locations which provide by their horizontally spaced geophone groups an essentially continuous coverage of subsurface beds. Traces from geophones or groups of geophones are positioned adjacent each other to form a display that may represent a horizontal distance of from several thousand feet to several miles of subsurface survey. When such a display is viewed with the beginning of each trace or time zero (the instant of the dynamite detonation) located at the top of the cross section, increasing time and likewise increasing depth are represented by events shown at a greater distance below the top of the cross section. The general appearance of such a display is that of an essentially vertical slice through a segment of the earth and shows depth and attitude of the geological strata. It is to a display of this type that our invention is directed.

Inherent in each of the recorded trace signals are certain errors of timing that must be corrected before the seismic information on each of the several traces may be displayed in proper mutual relationship. The two principal sources of these time errors arise from differences in elevation of the several geophone groups and a time delay in the signals from geophone groups located further from the shot point than are other groups. It is usual practice to introduce compensating time adjustments to each of the individual traces in one of the several types of geophysical data processors. Frequently other corrections may also be introduced where it is desirable to adjust the timing of the traces to a common horizon. While it is sometimes possible in the case of the two corrections just mentioned, those of terrain and spread geometry, to arrive by a computation at a time correction that should be applied to each specific trace, in many instances it is virtually impossible or at least impractical to determine a corresponding figure to be introduced into the computer which will properly correct the timing of each trace with respect to a selected horizon. To determine the appropriate time interval for each trace in the latter case, it is frequently necessary to process an entire line of data using an estimated or approximated group of correction values. Inspection of this display will then permit trial adjustments and measurement of trace displacements required to fully compensate all timing errors and to position the traces to a chosen reference horizon. Our invention provides a more direct means of determining these necessary adjustments to producing a cross section in which all timing errors are correctly compensated. It is, therefore, an object of the present invention to provide a means and apparatus by which the required adjustments of individual traces on the cross section may be rapidly and accurately evaluated.

It is also an object of our invention to provide a means by which desired time corrections may be made directly on such seismic cross sections.

It is a further object of this invention to provide a means by which a photographic record may be made directly from a cross section that has been adjusted to conform to any arbitrary requirements.

The method of opeation and preferred embodiments of our invention will be better understood when the following description is read in association with the drawings.

FIGURE 5 is a perspective drawing of one embodiment of the present invention.

Figure 1:
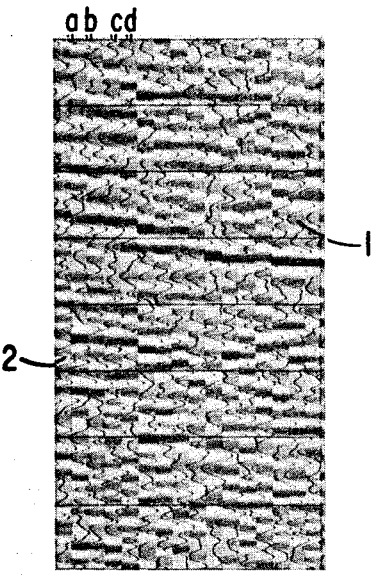
FIGURE 1 illustrates a portion of a variable density cross section.

When shown on more than one figure, the same apparatus part is indicated by the same number. As an aid to complete understanding of the present invention, attention is directed to FIGURE 1. Here we show a portion of a seismic cross section in which four individual seismic signals are displayed as traces $a$, $b$, $c$, and $d$ in side-by-side relationship. Superimposed over a typical variable density signal 1 is essentially the same signal displayed as a variable deflection trace 2. This type of dual display is frequently used in seismic interpretation and here serves to illustrate the relationship between variable density display and the conventional deflection trace display. Such composite traces are sometimes referred to as VDD (variable density deflection).

Figure 2:
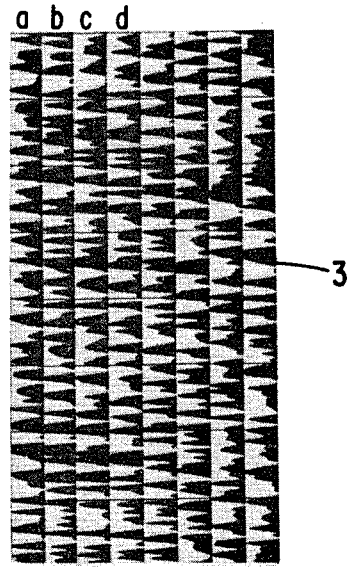
FIGURE 2 shows a segment of a similar cross section displayed as variable area.

FIGURE 2 serves to further illustrate the channelized nature of the recorded signals when seismic data are prepared for display in cross section form. FIGURE 2, as does FIGURE 1, displays many adjacent seismic information channels in which the electrical signals are represented by variations in the size and shape of the darkened areas such as 3. Insofar as the operation of the present invention is concerned, either type of display may be used.

Figure 3:
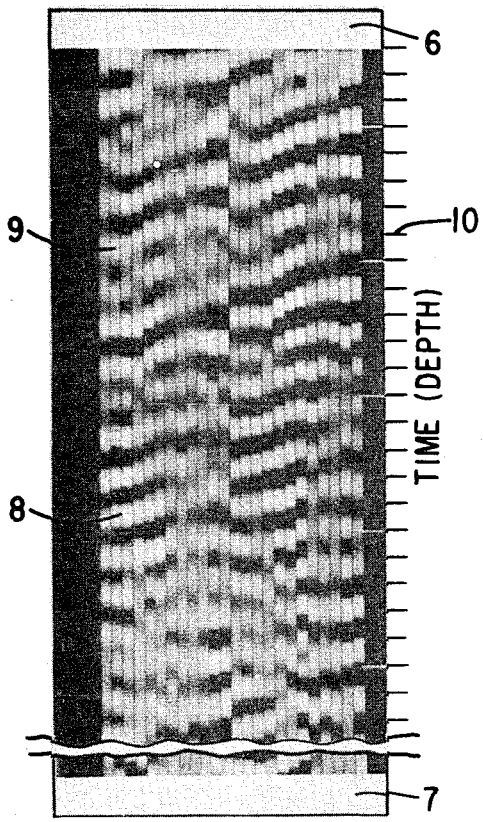
FIGURE 3 represents a typical seismic cross section which has been slitted between traces.

FIGURE 3 represents a typical variable density cross section consisting of a multitude of traces and serves to illustrate the manner in which subsurface beds appear as more or less horizontal bands of dark and light shading. The corrections which need to be applied to seismic data prior to display as a cross section are of two types. The first or static corrections consist of time adjustments which must be made to individual traces to compensate for differences in elevation of the earth surface upon which the geophones are located and a further time adjustment to compensate for velocity changes in the near surface or weathered beds. The need for dynamic corrections, the second type of time adjustment, results from the fact that various geophones or groups of geophones are positioned at different distances from the point of origin of the seismic wave and from the fact that the velocity of seismic waves is not constant through the earth but usually increases with depth.

In FIGURE 3, attention is called to the fact that slits have been made between adjacent traces. These slits do not extend completely to the end of the cross-section sheet, but by being stopped short provide areas 6 and 7 of the recording medium, film or sensitized paper, at either end of the section which serve to retain the traces in their original sequence. A set of power driven slitting rolls is convenient for slitting the cross section between traces. Such a device may be constructed with multiple shearing discs at fixed intervals throughout the width of the cutting rollers. Such construction is satisfactory for use with cross sections having traces of fixed width. More frequently, however, it is desirable from time to time to record the initial cross section with traces wider or narrower than usual. To accommodate this change in slitting interval, a cutter with adjustable shearing discs is required. In either case, such devices are well known to those skilled in the art and are mentioned here only in the interest of completeness.

A typical subsurface strata 8 is shown on this variable density cross section. Data element 9 is seen to be shifted upward from the point which would provide alignment with corresponding seismic event on nearby traces. The value of time increment necessary to bring these adjacent traces into a logical alignment can be determined by referring to timing scale 10. Time corrections for spread geometry (normal move-out) are usually made to each of the traces during the initial playback and plotting of the field recorded magnetic tapes. In the interest of greater clarity, it is to be assumed that this class of time adjustments has been made on the cross section shown in FIGURE 3.

Figure 4:
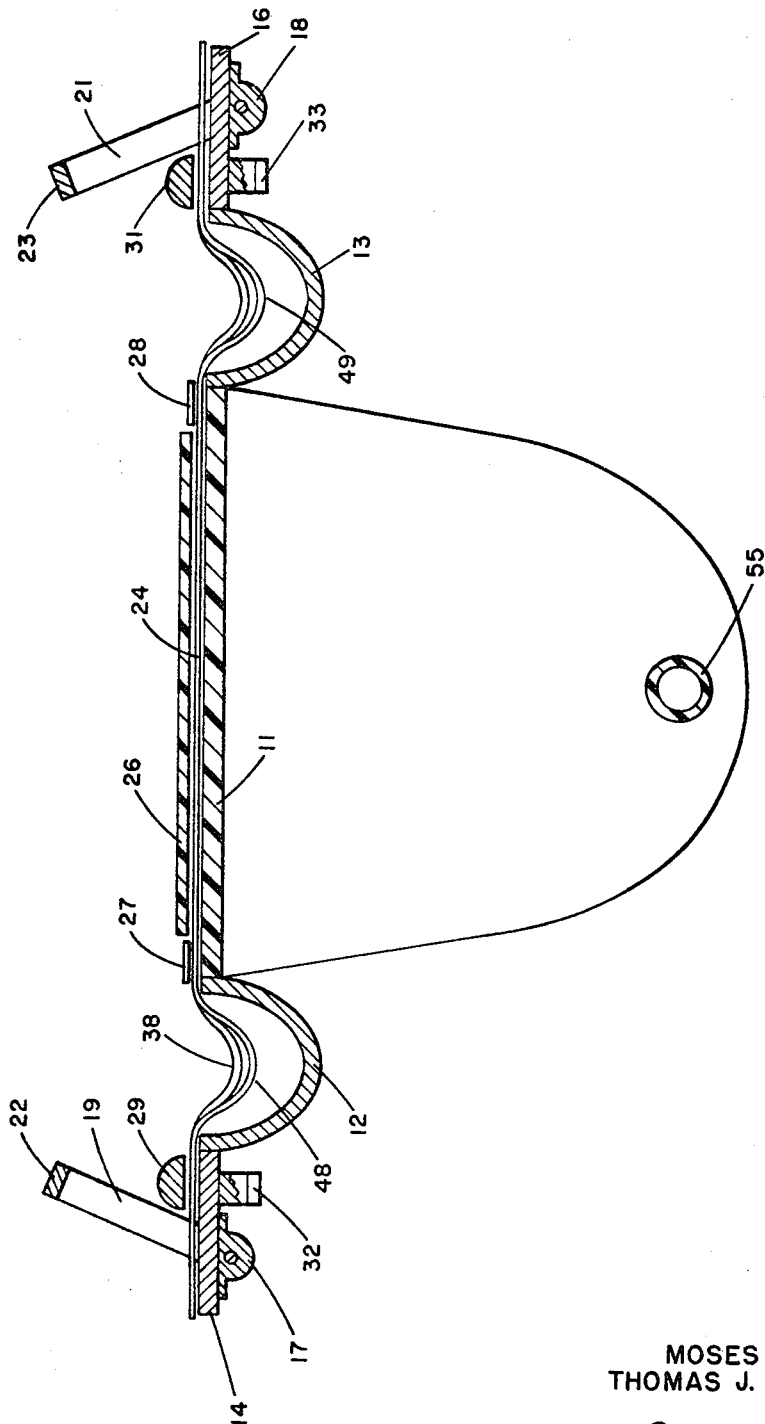
FIGURE 4 is a cross section view of an embodiment of our invention.

The embodiment of our invention hereinafter described provides a means for longitudinally shifting individual traces of a cross section by selected time intervals. The manner in which this is accomplished will be readily understood by referring to FIGURES 4 and 5. In FIGURE 4, baseplate 11 is a translucent or transparent material such as plastic or glass. This may be clear or frosted. At either end of baseplate 11 are troughs 12 and 13. Extending outwardly from trough 12 and 13 are portions of table top 14 and 16. Attached to portions of table top 14 and 16 are bearings 17 and 18 which carry arms 19 and 21, respectively. At the free ends of arms 19 and 21 are attached cross bars 22 and 23 which extend away from the reader in this cross-section view. Positioned on the surface of and in direct contact with the baseplate 11 is the slitted seismic cross section 24. Superimposed on cross section 24 is transparent friction plate 26, this is preferably constituted of clear plastic but may be glass. At either end of friction plate 26 are shown the ends of strips of transparent adhesive tape 27 and 28. Weight bars 29 and 31 are positioned at the outer ends of the cross section to maintain friction contact with the table top.

With cross section 24 positioned between baseplate 11 and overlying friction plate 26 (adhesive tapes 27 and 28 not in place at this time), arms 22 and 23 are lowered against stops 32 and 33. This forms shallow folds or wave 48 and 49 in cross section by drawing the unslitted portion under friction weights 29 and 31. When these folds have been formed, arms 22 and 23 are folded outwardly to remove them from the area of the cross section. It will now be seen that any individual traces such as 38, may be moved lengthwise under friction plate 26, the necesary slack being provided by the waves into which the strips have been formed.

FIGURE 5, which is a perspective drawing of the preferred embodiment of our invention, illustrates additional features of the apparatus and method of operation. In this figure we show all essential parts of the apparatus and illustrate one method of adjusting trace positions. In this figure transparent baseplate 11 is shown with slitted cross section 24 in position under transparent friction plate 26. The extreme ends of the cross section 41 and 42 are shown as being unslitted. These unslitted ends are held in position on table tops 14 and 16 by friction weights 29 and 31. The traces of section 24 have been formed into waves 48 and 49 by pivoted bars 22 and 23.

Individual traces may now be freely moved in an endwise manner under friction plate 26 by the use of a rubber-tipped stylus 53. The extent of movement introduced into each individual trace may readily be evaluated by observing the position of the trace with respect to fiducial mark 54 engraved on under side of friction plate 26. If desired, this displacement may be measured directly in milliseconds, which values may be then introduced into the data processing system and used to produce a corrected cross section. In the process of shifting individual traces in a timewise fashion to introduce corrections, it sometimes becomes desirable to restore the section to its original form and introduce a new set of adjustments. With the embodiment of our invention, this is accomplished by simply reforming waves 48 and 49 with pivoted bars 22 and 23.

When all traces have been shifted as required, they may be affixed in their relative positions by the application of a transverse length of transparent pressure-sensitive tape shown as 27 and 28 in FIGURE 4. Friction plate 26 may be removed when the traces have been taped in this manner. Additional lengths of transparent pressure-sensitive tape may be applied as required to assure permanence to the trace arrangement.

Light source 55 located within light shield 56 serves to transilluminate the cross section during the adjustment process. Where a permanent record of the adjusted traces is required, a sheet of photographic recording material, either paper or film, may be positioned with the photosensitive side in contact with the adjusted cross section and held firmly in place by replacing friction plate 26 over it. When a photographic record is made as outlined above, light source 55 serves as a source of exposure to form a latent photographic image on the recording medium, which may then be developed by methods well known in the art.

While we have illustrated by figures and specifications the preferred embodiment of the present invention, it is recognized that other arrangements of these or equivalent materials will be readily apparent to one skilled in the art. It should not be considered that the scope of this invention is limited by this embodiment and the specifications thereof, but rather is to be ascertained by reference to the appended claims.

We claim:

1. An apparatus for the adjustment of seismic data displayed in cross section form comprising in combination a transilluminated area of transparent table top, a seismic cross section consisting of adjacent information channels which have been slit apart with substantially parallel slits between channels throughout the length of said channels except for an area at the ends of said section, said cross section being positioned on said transilluminated table top and at least a portion thereof being maintained in contact with said transilluminated baseplate by overlying friction plate, said individual traces of said slitted cross section being formed into waves in the areas of said cross section adjacent to said portion, and secured in said waved shape by weights positioned to maintain unslitted portions of said cross section in friction contact with said table top, so that said individual traces of said portion of said cross section may be moved individually in a direction parallel to said slits.

2. The apparatus of claim 1 in which said overlying friction plate covering said portion of said cross section is transparent.

3. The apparatus of claim 1 in which a sheet of photographically sensitive recording medium is placed in contact with said traces and secured by said overlying friction plate.

4. A method for the enhancement of seismic data displayed as a cross section of parallel channelized traces in which time corrections are introduced into said individual traces comprising slitting apart said individual traces substantially throughout the length of said individual traces except for an area in either end of said cross section, supporting on a plane at least part of said slitted section, supporting separately the unslitted part of said section with a fold between this and the supported slitted section, and adjusting at least one of said traces longitudinally and individually by sliding said individual traces longitudinally.

5. In the method of claim 4, the step of producing a photographic record of said adjusted traces by placing in contact with said adjusted traces, photographic recording medium and producing a latent image on said photographic material by directing illumination through said adjusted cross section to impinge upon said photographic recording medium, thence processing said photographic medium to make visible said latent image.

References Cited
UNITED STATES PATENTS

| | | | |
|---|---|---|---|
| 3,011,145 | 11/1961 | Eisler et al. | 340—15.5 |
| 3,143,055 | 8/1964 | Alexander | 95—73 |
| 3,143,946 | 8/1964 | Merten | 95—73 |

NORTON ANSHER, *Primary Examiner.*

G. M. HOFFMAN, *Assistant Examiner.*